(12) United States Patent
Anderson et al.

(10) Patent No.: US 8,334,022 B2
(45) Date of Patent: Dec. 18, 2012

(54) REINFORCED SILICONE RESIN FILM AND METHOD OF PREPARING SAME

(75) Inventors: Nicole Anderson, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 758 days.

(21) Appl. No.: 11/989,896

(22) PCT Filed: Jun. 21, 2006

(86) PCT No.: PCT/US2006/024021
§ 371 (c)(1),
(2), (4) Date: Jan. 7, 2009

(87) PCT Pub. No.: WO2007/018756
PCT Pub. Date: Feb. 15, 2007

(65) Prior Publication Data
US 2009/0155577 A1    Jun. 18, 2009

Related U.S. Application Data

(60) Provisional application No. 60/705,623, filed on Aug. 4, 2005, provisional application No. 60/765,908, filed on Feb. 7, 2006, provisional application No. 60/772,592, filed on Feb. 10, 2006.

(51) Int. Cl.
*B05D 3/00* (2006.01)
(52) U.S. Cl. .................. 427/387; 427/389.8; 427/389.9; 427/392; 427/394; 427/396; 427/412
(58) Field of Classification Search .................. None
See application file for complete search history.

(56) References Cited

U.S. PATENT DOCUMENTS

| | | |
|---|---|---|
| 736,971 A | 8/1903 | Jenkins |
| 2,702,764 A | 2/1955 | Painter et al. |
| 2,915,475 A | 12/1959 | Bugosh et al. |
| 3,031,417 A | 4/1962 | Bruce |
| 3,419,593 A | 12/1968 | Willing et al. |
| 3,445,420 A | 5/1969 | Kookootsedes et al. |
| 4,087,585 A | 5/1978 | Schulz |
| 4,260,780 A | 4/1981 | West |
| 4,273,697 A | 6/1981 | Sumimura et al. |
| 4,276,424 A | 6/1981 | Peterson |
| 4,314,956 A | 2/1982 | Baney et al. |
| 4,324,901 A | 4/1982 | West et al. |
| 4,332,525 A | 6/1982 | Cheney, Jr. |
| 4,395,443 A | 7/1983 | Shimizu et al. |
| 4,460,638 A | 7/1984 | Haluska |
| 4,460,639 A | 7/1984 | Chi et al. |
| 4,460,640 A | 7/1984 | Chi et al. |
| 4,500,447 A | 2/1985 | Kobayashi et al. |
| 4,510,094 A | 4/1985 | Drahnak |
| 4,530,879 A | 7/1985 | Drahnak |
| 4,537,829 A | 8/1985 | Blizzard et al. |
| 4,568,566 A | 2/1986 | Tolentino |
| 4,572,814 A | 2/1986 | Naylor et al. |
| 4,618,666 A | 10/1986 | Porte |
| 4,761,454 A | 8/1988 | Oba et al. |
| 4,766,176 A | 8/1988 | Lee et al. |
| 4,898,689 A | 2/1990 | Hamada et al. |
| 4,916,169 A | 4/1990 | Boardman et al. |
| 4,952,658 A | 8/1990 | Kalchauer et al. |
| 5,017,654 A | 5/1991 | Togashi et al. |
| 5,135,980 A | 8/1992 | Watanabe |
| 5,166,287 A | 11/1992 | Kalchauer et al. |
| 5,194,649 A | 3/1993 | Okawa |
| 5,213,868 A | 5/1993 | Liberty et al. |
| 5,256,480 A | 10/1993 | Inoue et al. |
| 5,278,272 A | 1/1994 | Lai et al. |
| 5,281,455 A | 1/1994 | Braun et al. |
| 5,283,309 A | 2/1994 | Morita |
| 5,310,843 A | 5/1994 | Morita |
| 5,312,946 A | 5/1994 | Stank et al. |
| 5,319,051 A | 6/1994 | Tabei et al. |
| 5,358,983 A | 10/1994 | Morita |
| 5,371,139 A | 12/1994 | Yokoyama et al. |
| 5,468,826 A | 11/1995 | Gentle et al. |
| 5,468,827 A | 11/1995 | Morita |
| 5,474,608 A | 12/1995 | Beisswanger |
| 5,486,588 A | 1/1996 | Morita |

(Continued)

FOREIGN PATENT DOCUMENTS

CN    1528000 A    9/2004

(Continued)

OTHER PUBLICATIONS

Partial English Translation for JP62-003947, dated Nov. 15, 2011, 2 pages.

(Continued)

*Primary Examiner* — Erma Cameron
(74) *Attorney, Agent, or Firm* — Howard & Howard Attorneys PLLC

(57) ABSTRACT

A method of preparing a reinforced silicone resin film, the method comprising the steps of impregnating a fiber reinforcement in a free radical-curable silicone composition comprising a silicone resin, and curing the silicone resin of the impregnated fiber reinforcement; wherein the reinforced silicone resin film comprises from 10 to 99% (w/w) of the cured silicone resin and the film has a thickness of from 15 to 500 µm; and a reinforced silicone resin film prepared according to the method.

9 Claims, No Drawings

U.S. PATENT DOCUMENTS

| | | | |
|---|---|---|---|
| 5,496,961 A | 3/1996 | Dauth et al. | |
| 5,527,578 A * | 6/1996 | Mazurek et al. | 428/41.8 |
| 5,530,075 A | 6/1996 | Morita | |
| 5,580,915 A | 12/1996 | Lin | |
| 5,581,008 A | 12/1996 | Kobayashi | |
| 5,585,147 A | 12/1996 | Ogawa et al. | |
| 5,738,976 A | 4/1998 | Okinoshima et al. | |
| 5,747,608 A | 5/1998 | Katsoulis et al. | |
| 5,794,649 A | 8/1998 | Spear et al. | |
| 5,801,262 A | 9/1998 | Adams | |
| 5,824,761 A | 10/1998 | Bujanowski et al. | |
| 5,830,950 A * | 11/1998 | Katsoulis et al. | 525/477 |
| 5,861,467 A | 1/1999 | Bujanowski et al. | |
| 5,904,796 A | 5/1999 | Freuler et al. | |
| 5,959,038 A | 9/1999 | Furukawa et al. | |
| 5,972,512 A | 10/1999 | Boisvert et al. | |
| 6,046,283 A | 4/2000 | Katsoulis et al. | |
| 6,194,063 B1 | 2/2001 | Oura et al. | |
| 6,204,301 B1 | 3/2001 | Oshima et al. | |
| 6,287,639 B1 | 9/2001 | Schmidt et al. | |
| 6,297,305 B1 | 10/2001 | Nakata et al. | |
| 6,310,146 B1 * | 10/2001 | Katsoulis et al. | 525/477 |
| 6,352,610 B1 | 3/2002 | Schmidt et al. | |
| 6,368,535 B1 | 4/2002 | Katsoulis et al. | |
| 6,376,078 B1 | 4/2002 | Inokuchi | |
| 6,378,599 B1 | 4/2002 | Schmidt et al. | |
| 6,387,487 B1 | 5/2002 | Greenberg et al. | |
| 6,407,922 B1 | 6/2002 | Eckland et al. | |
| 6,432,497 B2 | 8/2002 | Bunyan | |
| 6,451,869 B1 | 9/2002 | Butts | |
| 6,617,674 B2 | 9/2003 | Becker et al. | |
| 6,644,395 B1 | 11/2003 | Bergin | |
| 6,652,958 B2 | 11/2003 | Tobita | |
| 6,656,425 B1 | 12/2003 | Benthien et al. | |
| 6,660,395 B2 | 12/2003 | McGarry et al. | |
| 6,689,859 B2 | 2/2004 | Li et al. | |
| 6,730,731 B2 | 5/2004 | Tobita et al. | |
| 6,783,692 B2 | 8/2004 | Bhagwagar | |
| 6,791,839 B2 | 9/2004 | Bhagwagar | |
| 6,831,145 B2 | 12/2004 | Kleyer et al. | |
| 6,838,005 B2 | 1/2005 | Tepper | |
| 6,841,213 B2 | 1/2005 | Parsonage et al. | |
| 6,884,314 B2 | 4/2005 | Cross et al. | |
| 6,902,688 B2 | 6/2005 | Narayan et al. | |
| 6,908,682 B2 | 6/2005 | Mistele | |
| 7,029,603 B2 | 4/2006 | Wang et al. | |
| 7,037,592 B2 | 5/2006 | Zhu et al. | |
| 7,074,481 B2 | 7/2006 | Watson | |
| 7,132,062 B1 | 11/2006 | Howard | |
| 7,147,367 B2 | 12/2006 | Balian et al. | |
| 7,163,720 B1 | 1/2007 | Dhaler et al. | |
| 7,253,442 B2 | 8/2007 | Huang et al. | |
| 7,311,967 B2 | 12/2007 | Dani et al. | |
| 7,339,012 B2 | 3/2008 | Prasse | |
| 7,381,470 B2 | 6/2008 | Suto et al. | |
| 7,459,192 B2 | 12/2008 | Parsonage et al. | |
| 7,563,515 B2 | 7/2009 | Ekeland et al. | |
| 7,622,159 B2 | 11/2009 | Mertz et al. | |
| 7,658,983 B2 | 2/2010 | Mormont et al. | |
| 7,799,842 B2 | 9/2010 | Anderson et al. | |
| 7,850,870 B2 | 12/2010 | Ahn et al. | |
| 2003/0047718 A1 | 3/2003 | Narayan et al. | |
| 2003/0054162 A1 | 3/2003 | Watson | |
| 2003/0077478 A1 | 4/2003 | Dani et al. | |
| 2003/0096104 A1 | 5/2003 | Tobita et al. | |
| 2003/0170418 A1 | 9/2003 | Mormont et al. | |
| 2003/0175533 A1 | 9/2003 | McGarry et al. | |
| 2003/0213939 A1 | 11/2003 | Narayan | |
| 2004/0053059 A1 | 3/2004 | Mistele | |
| 2004/0089851 A1 | 5/2004 | Wang et al. | |
| 2004/0101679 A1 | 5/2004 | Mertz et al. | |
| 2004/0126526 A1 | 7/2004 | Parsonage et al. | |
| 2004/0166332 A1 | 8/2004 | Zhu et al. | |
| 2005/0059754 A1 | 3/2005 | Lunt et al. | |
| 2005/0113749 A1 | 5/2005 | Parsonage et al. | |
| 2005/0227091 A1 | 10/2005 | Suto et al. | |
| 2005/0281997 A1 | 12/2005 | Grah | |
| 2007/0020468 A1 | 1/2007 | Ekeland et al. | |
| 2007/0120100 A1 | 5/2007 | Glatkowski et al. | |
| 2007/0246245 A1 | 10/2007 | Ahn et al. | |
| 2008/0051548 A1 | 2/2008 | Bailey et al. | |
| 2008/0115827 A1 | 5/2008 | Woods et al. | |
| 2008/0138525 A1 | 6/2008 | Bailey et al. | |
| 2009/0005499 A1 | 1/2009 | Fisher et al. | |
| 2009/0090413 A1 | 4/2009 | Katsoulis et al. | |
| 2009/0105362 A1 | 4/2009 | Anderson et al. | |
| 2009/0155577 A1 | 6/2009 | Anderson et al. | |
| 2009/0246499 A1 | 10/2009 | Katsoulis et al. | |
| 2009/0286002 A1 * | 11/2009 | Iezzi et al. | 427/508 |
| 2010/0028643 A1 | 2/2010 | Zhu | |
| 2010/0062247 A1 | 3/2010 | Fisher et al. | |
| 2010/0068538 A1 | 3/2010 | Fisher | |
| 2010/0075127 A1 | 3/2010 | Fisher et al. | |
| 2010/0086760 A1 | 4/2010 | Zhu | |
| 2010/0087581 A1 | 4/2010 | Fisher et al. | |
| 2010/0112321 A1 | 5/2010 | Zhu | |
| 2010/0129625 A1 | 5/2010 | Zhu | |
| 2010/0143686 A1 | 6/2010 | Zhu | |
| 2010/0209687 A1 | 8/2010 | Zhu | |
| 2010/0233379 A1 | 9/2010 | Fisher et al. | |
| 2010/0280172 A1 | 11/2010 | Zhu | |
| 2010/0308279 A1 * | 12/2010 | Zhou et al. | 252/511 |

FOREIGN PATENT DOCUMENTS

| | | |
|---|---|---|
| CN | 1558931 A | 12/2004 |
| CN | 1676568 A | 10/2005 |
| DE | 19647368 | 5/1998 |
| DE | 19915378 A1 | 10/2000 |
| DE | 4033157 | 9/2003 |
| EP | 0126535 | 11/1984 |
| EP | 0126535 A1 | 11/1984 |
| EP | 0358452 A2 | 3/1990 |
| EP | 0480680 A1 | 4/1992 |
| EP | 0566311 A2 | 10/1993 |
| EP | 0562922 B1 | 5/1997 |
| EP | 0850998 A2 | 7/1998 |
| EP | 0936250 A2 | 8/1999 |
| EP | 1050538 A2 | 11/2000 |
| EP | 1065248 A2 | 1/2001 |
| EP | 1454962 A1 | 9/2004 |
| EP | 1391492 B1 | 6/2006 |
| FR | 2564470 A1 | 11/1985 |
| GB | 736971 | 9/1955 |
| JP | 47-27300 A | 10/1972 |
| JP | 53-118470 A | 10/1978 |
| JP | 59-025742 A | 2/1984 |
| JP | 59-096122 | 6/1984 |
| JP | 59-199547 A | 11/1984 |
| JP | 62-003947 | 1/1987 |
| JP | 02-058587 A | 2/1990 |
| JP | 8-27381 A | 1/1996 |
| JP | 8-37418 A | 2/1996 |
| JP | 9-64391 A | 3/1997 |
| JP | 10-001549 | 1/1998 |
| JP | 10-212410 A | 8/1998 |
| JP | 2000-119526 A | 4/2000 |
| JP | 2000-195337 A | 7/2000 |
| JP | 2001-291431 A | 10/2001 |
| JP | 2004-002653 A | 1/2004 |
| JP | 2004-339427 A | 12/2004 |
| JP | 2005-520020 A | 7/2005 |
| JP | 2007-090817 A | 4/2007 |
| JP | 2008-530339 A | 8/2008 |
| TW | 2004/18964 A | 10/2004 |
| WO | 94/17003 A1 | 8/1994 |
| WO | 02/082468 A1 | 10/2002 |
| WO | 02/085612 A2 | 10/2002 |
| WO | 03/078079 A1 | 9/2003 |
| WO | 03/099828 A1 | 12/2003 |
| WO | 03104329 A1 | 12/2003 |
| WO | 2004/035661 A1 | 4/2004 |
| WO | 2004/060472 A1 | 7/2004 |
| WO | 2004076175 A1 | 9/2004 |
| WO | 2004/106420 A2 | 12/2004 |
| WO | 2005/114324 A2 | 12/2005 |
| WO | 2006/088645 A1 | 8/2006 |
| WO | 2006/088646 A1 | 8/2006 |

| WO | 2007/013135 | A1 | 2/2007 |
| WO | 2007/018756 | A1 | 2/2007 |
| WO | 2007/092118 | A2 | 8/2007 |
| WO | 2007/097835 | A2 | 8/2007 |
| WO | 2007/121006 | A2 | 10/2007 |
| WO | 2007/123901 | A1 | 11/2007 |
| WO | 2008/013611 | A1 | 1/2008 |
| WO | 2008/013612 | A1 | 1/2008 |
| WO | 2008/045104 | A2 | 4/2008 |
| WO | 2008/051242 | A2 | 5/2008 |
| WO | 2009/007786 | A2 | 1/2009 |

OTHER PUBLICATIONS

English language abstract of JP 02-058587 extracted from espacenet.com database dated Nov. 15, 2011; 1 page.
English language abstract of JP 2000-119526 extracted from espacenet.com database dated Nov. 15, 2011; 1 page.
English language abstract of JP 53-118470 extracted from espacenet.com database dated Nov. 15, 2011; 1 page.
English language abstract of JP 59-096122 extracted from espacenet.com database dated Aug. 26, 2011; 1 page.
English language abstract of FR 2564470 extracted from espacenet.com database dated Oct. 12, 2010; 2 pages.
English language abstract of JP 10-001549 extracted from espacenet.com database dated Aug. 26, 2011; 1 page.
English language abstract of DE 19647368 extracted from espacenet.com database dated Aug. 26, 2011; 1 page.
English language abstract of DE 19915378 extracted from espacenet.com database dated Aug. 26, 2011; 1 page.
English language abstract of DE 4033157 extracted from espacenet.com database dated Aug. 26, 2011; 1 page.
English language abstract of CN 1528000 extracted from espacenet.com database dated Sep. 23, 2010; 1 page.
English language abstract of TW 2004/18964 dated Sep. 23, 2010; 3 pages.
English language translation and abstract for JP 2004-339427 extracted from PAJ database, dated Oct. 15, 2010, 51 pages.
English language abstract of CN 1558931 extracted from espacenet.com database dated Aug. 26, 2011; 1 page.
English language abstract of CN 1676568 extracted from espacenet.com database dated Mar. 1, 2011; 1 page.
English language abstract of JP 2007-090817 extracted from espacenet.com database dated Aug. 26, 2011; 1 page.
Guo, Andrew, et al., "Highly Active Visible-Light Photocatalysts for Curing a Ceramic Precursor," Chemical Materials, 1998, pp. 531-536, vol. 10, American Chemical Society.
Zhu, H.Y., "Novel synthesis of aluminum oxide nanofibers," Materials Research Society Symposium Proceedings, vol. 703, held Nov. 26-29, 2001, Nanophase and Nanocomposite Materials IV. Symposium, published 2002, pp. 25-30, Materials Research Society, Warrendale, Pennsylvania, USA.
Reese, Herschel, et al. "Development of Silicone Substrates to be Used with CIGS Deposition," Government Contract F49620-03-C-0047, AFOSR/NL Report, Air Force Office of Scientific Research, Feb. 1, 2005, pp. 1-62, Government Report: AFRL-SR-AR-TR-05, published Apr. 29, 2005, Arlington, Virginia.
Frogley, Mark D. et al., "Mechanical Properties of Carbon Nanoparticle-reinforced Elastomers", Composites Science and Technology, 2003, pp. 1647-1654, vol. 63, Elsevier Ltd.
English language abstract of JP 2000-195337 extracted from espacenet.com database dated Nov. 14, 2011; 1 page.
English Language abstract of JP 2004-002653 extracted from espacenet.com database dated Nov. 14, 2011; 1 page.
English Language abstract of JP 2001-291431 extracted from espacenet.com database dated Nov. 14, 2011; 1 page.
English Language abstract of JP 9-64391 extracted from espacenet.com database dated Nov. 14, 2011; 1 page.
English Language abstract of JP 8-37418 extracted from espacenet.com database dated Nov. 14, 2011; 1 page.
English Language abstract of JP 8-27381 extracted from espacenet.com database dated Nov. 14, 2011; 1 page.

* cited by examiner

REINFORCED SILICONE RESIN FILM AND METHOD OF PREPARING SAME

CROSS REFERENCE TO RELATED APPLICATIONS

This application is a U.S. national stage filing under 35 U.S.C. §371 of PCT Application No. PCT/US2006/024021 filed on 21 Jun. 2006, currently pending, which claims the benefit of U.S. Provisional Patent Application No. 60/705,623 filed 4 Aug. 2005; U.S. Provisional Patent Application No. 60/765,908 filed 7 Feb. 2006; and U.S. Provisional Application No. 60/772,592 filed 10 Feb. 2006 under 35 U.S.C. §119 (e). PCT Application No. PCT/US2006/024021 and U.S. Provisional Patent Application No. 60/705,623, 60/765,908 and 60/772,592 are hereby incorporated by reference.

FIELD OF THE INVENTION

The present invention relates to a method of preparing a reinforced silicone resin film and more particularly to a method comprising impregnating a fiber reinforcement in a free radical-curable silicone composition comprising a silicone resin, and curing the silicone resin of the impregnated fiber reinforcement. The present invention also relates to a reinforced silicone resin film prepared according to the method.

BACKGROUND OF THE INVENTION

Silicone resins are useful in a variety of applications by virtue of their unique combination of properties, including high thermal stability, good moisture resistance, excellent flexibility, high oxygen resistance, low dielectric constant, and high transparency. For example, silicone resins are widely used as protective or dielectric coatings in the automotive, electronic, construction, appliance, and aerospace industries.

Although silicone resin coatings can be used to protect, insulate, or bond a variety of substrates, free standing silicone resin films have limited utility due to low tear strength, high brittleness, low glass transition temperature, and high coefficient of thermal expansion. Consequently, there is a need for free standing silicone resin films having improved mechanical and thermal properties.

SUMMARY OF THE INVENTION

The present invention is directed to a method of preparing a reinforced silicone resin film, the method comprising the steps of:
impregnating a fiber reinforcement in a free radical-curable silicone composition comprising a silicone resin; and
curing the silicone resin of the impregnated fiber reinforcement; wherein the reinforced silicone resin film comprises from 10 to 99% (w/w) of the cured silicone resin and the film has a thickness of from 15 to 500 μm.

The present invention is also directed to a reinforced silicone resin film prepared according to the aforementioned method.

The reinforced silicone resin film of the present invention has low coefficient of thermal expansion, high tensile strength, and high modulus compared to an un-reinforced silicone resin film prepared from the same silicone composition. Also, although the reinforced and un-reinforced silicone resin films have comparable glass transition temperatures, the reinforced film exhibits a much smaller change in modulus in the temperature range corresponding to the glass transition.

The reinforced silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

DETAILED DESCRIPTION OF THE INVENTION

As used herein, the term "free of aliphatic unsaturation" means the hydrocarbyl or halogen-substituted hydrocarbyl group does not contain an aliphatic carbon-carbon double bond or carbon-carbon triple bond. Also, the term "mol % of the groups $R^2$ in the silicone resin are alkenyl" is defined as the ratio of the number of moles of silicon-bonded alkenyl groups in the silicone resin to the total number of moles of the groups $R^2$ in the resin, multiplied by 100.

A method of preparing a reinforced silicone resin film according to the present invention comprises the steps of:
impregnating a fiber reinforcement in a free radical-curable silicone composition comprising a silicone resin; and
curing the silicone resin of the impregnated fiber reinforcement; wherein the reinforced silicone resin film comprises from 10 to 99% (w/w) of the cured silicone resin and the film has a thickness of from 15 to 500 μm.

In the first step of the method of preparing a reinforced silicone resin film, a fiber reinforcement is impregnated in a free radical-curable silicone composition comprising a silicone resin.

The free radical-curable silicone composition can be any free radical curable silicone composition containing a silicone resin. Examples of free radical-curable silicone compositions include peroxide-curable silicone compositions, radiation-curable silicone compositions containing a free radical photoinitiator, and high energy radiation-curable silicone compositions. Typically, the free radical-curable silicone composition comprises the aforementioned silicone resin and, optionally, a cross-linking agent and/or a free radical initiator (e.g., a free radical photoinitiator or organic peroxide).

The silicone resin can be any silicone resin that can be cured (i.e., cross-linked) by at least one method selected from (i) exposing the silicone resin to radiation having a wavelength of from 150 to 800 nm in the presence of a free radical photoinitiator, (ii) heating the silicone resin in the presence of an organic peroxide, and (iii) exposing the silicone resin to an electron beam. The silicone resin is typically a copolymer containing T siloxane units and/or Q siloxane units in combination with M and/or D siloxane units.

For example, the free radical-curable silicone composition can comprise a silicone resin having the formula

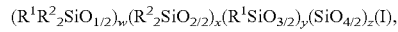

$(R^1R^2{}_2SiO_{1/2})_w(R^2{}_2SiO_{2/2})_x(R^1SiO_{3/2})_y(SiO_{4/2})_z$ (I), wherein $R^1$ is $C_1$ to $C_{10}$ hydrocarbyl or $C_1$ to $C_{10}$ halogen-substituted hydrocarbyl, both free of aliphatic unsaturation; $R^2$ is $R^1$, alkenyl, or alkynyl; w is from 0 to 0.99; x is from 0 to 0.99; y is from 0 to 0.99; z is from 0 to 0.65; w+x is from 0.01 to 0.99; y+z is from 0.01 to 0.99; and w+x+y+z=1.

The hydrocarbyl and halogen-substituted hydrocarbyl groups represented by $R^1$ are free of aliphatic unsaturation and typically have from 1 to 10 carbon atoms, alternatively from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different, typically have from 2 to about 10 carbon atoms, alternatively from 2 to 6 carbon atoms, and are exemplified by, but not limited to, vinyl, allyl, butenyl, hexenyl, and octenyl.

The alkynyl groups represented by $R^2$, which may be the same or different, typically have from 2 to about 10 carbon atoms, alternatively from 2 to 6 carbon atoms, and are exemplified by, but not limited to, ethynyl, propynyl, butynyl, hexynyl, and octynyl.

In the formula (I) of the silicone resin, the subscripts w, x, y, and z are mole fractions. The subscript w typically has a value of from 0 to 0.99, alternatively from 0.02 to 0.75, alternatively from 0.05 to 0.3; the subscript x typically has a value of from 0 to 0.99, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.65, alternatively from 0 to 0.25, alternatively from 0 to 0.15. Also, the sum w+x is typically from 0.01 to 0.99, alternatively from 0.05 to 0.5, alternatively from 0.1 to 0.35. Further, the sum y+z is typically from 0.01 to 0.99, alternatively from 0.5 to 0.95, alternatively from 0.65 to 0.9.

In one embodiment of the silicone resin, the silicone resin contains an average of at least one alkenyl group or alkynyl group, per molecule.

The silicone resin typically has a number-average molecular weight ($M_n$) of from 500 to 50,000, alternatively from 500 to 10,000, alternatively 1,000 to 3,000, where the molecular weight is determined by gel permeation chromatography employing a refractive index detector and silicone resin (MQ) standards.

The silicone resin typically contains less than 10% (w/w), alternatively less than 5% (w/w), alternatively less than 2% (w/w), of silicon-bonded hydroxy groups, as determined by $^{29}$Si NMR.

The silicone resin contains $R^1SiO_{3/2}$ units (i.e., T units) and/or $SiO_{4/2}$ units (i.e., Q units) in combination with $R^1R^2_2SiO_{1/2}$ units (i.e., M units) and/or $R^2_2SiO_{2/2}$ units (i.e., D units), where $R^1$ and $R^2$ are as described and exemplified above. For example, the silicone resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of silicone resins include, but are not limited to, resins having the following formulae:

$(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.15}(PhSiO_{3/2})_{0.75}(SiO_{4/2})_{0.1}$, and $(Vi_2MeSiO_{1/2})_{0.15}(ViMe_2SiO_{1/2})_{0.1}(PhSiO_{3/2})_{0.75}$, where Me is methyl, Vi is vinyl, Ph is phenyl, and the numerical subscripts outside the parenthesis denote mole fractions. Also, in the preceding formulae, the sequence of units is unspecified.

The silicone resin can be a single silicone resin or a mixture comprising two or more different silicone resins, each as described above.

Methods of preparing silicone resins are well known in the art; many of these resins are commercially available. Silicone resins are typically prepared by cohydrolyzing the appropriate mixture of chlorosilane precursors in an organic solvent, such as toluene. For example, a silicone resin consisting essentially of $R^1R^2_2SiO_{1/2}$ units and $R^1SiO_{3/2}$ units can be prepared by cohydrolyzing a compound having the formula $R^1R^2_2SiCl$ and a compound having the formula $R^1SiCl_3$ in toluene, where $R^1$ and $R^2$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, —NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

The free radical-curable silicone composition of the present method can comprise additional ingredients, provided the ingredient does not prevent the silicone resin of the impregnated fiber reinforcement from curing to form a silicone resin film having low coefficient of thermal expansion, high tensile strength, and high modulus, as described below. Examples of additional ingredients include, but are not limited to, silicone rubbers; unsaturated compounds; free radical initiators; organic solvents; UV stabilizers; sensitizers; dyes; flame retardants; antioxidants; fillers, such as reinforcing fillers, extending fillers, and conductive fillers; and adhesion promoters.

The free radical-curable silicone composition can further comprise at least one silicone rubber having an average of at least one silicon-bonded alkenyl group per molecule. As used herein, the term "silicone rubber" refers to a linear polydiorganosiloxane. The alkenyl group(s) can be located at terminal, pendant, or at both terminal and pendant positions.

The silicone rubber typically has a number-average molecular weight of from 500 to 1,000,000, alternatively from 1,000 to 100,000, alternatively from 1,500 to 10,000, where the molecular weight is determined by gel permeation chromatography employing a refractive index detector and silicone rubber standards.

The silicone rubber can be represented by the formula $$R^1R^3_2SiO(R^3_2SiO)_aSiR^3_2R^1 \qquad (II),$$

wherein $R^1$ is as described and exemplified above for the silicone resin, $R^3$ is $R^1$ or alkenyl, and the subscript a has a value such that the silicone rubber has a number-average molecular weight of from 500 to 1,000,000, provided the silicone rubber has an average of at least one silicon-bonded alkenyl group per molecule.

Examples of silicone rubbers include, but are not limited to, silicone rubbers having the following formulae:

$ViMe_2SiO(Me_2SiO)_aSiMe_2Vi$, $ViMe_2SiO(Ph_2SiO)_aSiMe_2Vi$, and $ViMe_2SiO(PhMeSiO)_aSiMe_2Vi$, where Me is methyl, Ph is phenyl, Vi is vinyl, and the subscript a has a value such that the silicone rubber has a number-average molecular weight of from 500 to 1,000,000.

The silicone rubber can be a single silicone rubber or a mixture comprising two or more different silicone rubbers, each as described above.

The concentration of the silicone rubber is typically from 0 to 50% (w/w), alternatively from 1 to 20% (w/w), alternatively from 5 to 10% (w/w), based on the total weight of the free radical-curable silicone composition.

Methods of preparing silicone rubbers containing silicon-bonded alkenyl groups are well known in the art; many of these compounds are commercially available.

The free radical-curable silicone composition can further comprise an unsaturated compound selected from (i) at least one organosilicon compound having at least one silicon-bonded alkenyl group per molecule, (ii) at least one organic compound having at least one aliphatic carbon-carbon double bond per molecule, and (iii) mixtures comprising (i) and (ii), wherein the unsaturated compound has a molecular weight less than 500. Alternatively, the unsaturated compound has a molecular weight less than 400 or less than 300. Also, the unsaturated compound can have a linear, branched, or cyclic structure.

The organosilicon compound can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl group(s) can be located at terminal, pendant, or at both terminal and pendant positions.

Examples of organosilanes include, but are not limited to, silanes having the following formulae:

$Vi_4Si$, $PhSiVi_3$, $MeSiVi_3$, $PhMeSiVi_2$, $Ph_2SiVi_2$, and $PhSi(CH_2CH=CH_2)_3$, where Me is methyl, Ph is phenyl, and Vi is vinyl.

Examples of organosiloxanes include, but are not limited to, siloxanes having the following formulae:

$PhSi(OSiMe_2Vi)_3$, $Si(OSiMe_2Vi)_4$, $MeSi(OSiMe_2Vi)_3$, and $Ph_2Si(OSiMe_2Vi)_2$, where Me is methyl, Vi is vinyl, and Ph is phenyl.

The organic compound can be any organic compound containing at least one aliphatic carbon-carbon double bond per molecule, provided the compound does not prevent the silicone resin of the impregnated fiber reinforcement from curing to form a silicone resin film having low coefficient of thermal expansion, high tensile strength, and high modulus, as described below. The organic compound can be an alkene, a diene, a triene, or a polyene. Further, in acyclic organic compounds, the carbon-carbon double bond(s) can be located at terminal, pendant, or at both terminal and pendant positions.

The organic compound can contain one or more functional groups other than the aliphatic carbon-carbon double bond. Examples of suitable functional groups include, but are not limited to, —O—, >C=O, —CHO, —CO$_2$—, —C≡N, —NO$_2$, >C=C<, —C≡C—, —F, —Cl, —Br, and —I. The suitability of a particular unsaturated organic compound for use in the silicone composition of the present invention can be readily determined by routine experimentation using the methods in the Examples below.

The organic compound can have a liquid or solid state at room temperature. Also, the organic compound can be soluble, partially soluble, or insoluble in the silicone composition. The normal boiling point of the organic compound, which depends on the molecular weight, structure, and number and nature of functional groups in the compound, can vary over a wide range. Preferably, the organic compound has a normal boiling point greater than the cure temperature of the composition. Otherwise, appreciable amounts of the organic compound may be removed by volatilization during cure.

Examples of organic compounds containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

The concentration of the unsaturated compound is typically from 0 to 70% (w/w), alternatively from 10 to 50% (w/w), alternatively from 20 to 40% (w/w), based on the total weight of the free radical-curable silicone composition.

Methods of preparing organosilanes and organosiloxanes containing silicon-bonded alkenyl groups, and organic compounds containing aliphatic carbon-carbon double bonds are well known in the art; many of these compounds are commercially available.

The free radical-curable silicone composition can further comprise at least one free radical initiator. The free radical initiator is typically a free radical photoinitiator or an organic peroxide. Further, the free radical photoinitiator can be any free radical photoinitiator capable of initiating cure (cross-linking) of the silicone resin upon exposure to radiation having a wavelength of from 200 to 800 nm.

Examples of free radical photoinitiators include, but are not limited to, benzophenone; 4,4'-bis(dimethylamino)benzophenone; halogenated benzophenones; acetophenone; α-hydroxyacetophenone; chloro acetophenones, such as dichloroacetophenones and trichloroacetophenones; dialkoxyacetophenones, such as 2,2-diethoxyacetophenone; α-hydoxyalkylphenones, such as 2-hydroxy-2-methyl-1-phenyl-1-propanone and 1-hydroxycyclohexyl phenyl ketone; α-aminoalkylphenones, such as 2-methyl-4'-(methylthio)-2-morpholiniopropiophenone; benzoin; benzoin ethers, such as benzoin methyl ether, benzoin ethyl ether, and benzoin isobutyl ether; benzil ketals, such as 2,2-dimethoxy-2-phenylacetophenone; acylphosphinoxides, such as diphenyl(2,4,6-trimethylbenzoyl)phosphine oxide; xanthone derivatives; thioxanthone derivatives; fluorenone derivatives; methyl phenyl glyoxylate; acetonaphthone; anthraquinone derivatives; sufonyl chlorides of aromatic compounds; and O-acyl α-oximinoketones, such as 1-phenyl-1,2-propanedione-2-(O-ethoxycarbonyl)oxime.

The free radical photoinitiator can also be a polysilane, such as the phenylmethylpolysilanes defined by West in U.S. Pat. No. 4,260,780, which is hereby incorporated by reference; the aminated methylpolysilanes defined by Baney et al. in U.S. Pat. No. 4,314,956, which is hereby incorporated by reference; the methylpolysilanes of Peterson et al. in U.S. Pat. No. 4,276,424, which is hereby incorporated by reference; and the polysilastyrene defined by West et al. in U.S. Pat. No. 4,324,901, which is hereby incorporated by reference.

The free radical photoinitiator can be a single free radical photoinitiator or a mixture comprising two or more different free radical photoinitiators. The concentration of the free radical photoinitiator is typically from 0.1 to 6% (w/w), alternatively from 1 to 3% (w/w), based on the weight of the silicone resin.

The free radical initiator can also be an organic peroxide. Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aroyl peroxides such as t-butyl perbenzoate, t-butyl peracetate, and t-butyl peroctoate.

The organic peroxide can be a single peroxide or a mixture comprising two or more different organic peroxides. The concentration of the organic peroxide is typically from 0.1 to 5% (w/w), alternatively from 0.2 to 2% (w/w), based on the weight of the silicone resin.

The free radical-curable silicone composition can further comprise at least one organic solvent. The organic solvent can be any aprotic or dipolar aprotic organic solvent that does not react with the silicone resin or additional ingredient(s) and is miscible with the silicone resin. Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The organic solvent can be a single organic solvent or a mixture comprising two or more different organic solvents, each as described above.

The concentration of the organic solvent is typically from 0 to 99% (w/w), alternatively from 30 to 80% (w/w), alternatively from 45 to 60% (w/w), based on the total weight of the free radical-curable silicone composition.

When the silicone composition described above contains one or more additional ingredients, for example, a free radical initiator, the composition can be a one-part composition comprising the silicone resin and optional ingredient(s) in a single part, or a multi-part composition comprising the components in two or more parts.

The one-part silicone composition is typically prepared by combining, in any order, the silicone resin and any optional ingredients in the stated proportions at ambient temperature, with or without the aid of an organic solvent. Also, the multi-part silicone composition can be prepared by combining the components in each part.

Mixing can be accomplished by any of the techniques known in the art such as milling, blending, and stirring, either in a batch or continuous process. The particular device is determined by the viscosity of the components and the viscosity of the final silicone composition.

The fiber reinforcement can be any reinforcement comprising fibers, provided the reinforcement has a high modulus and high tensile strength. The fiber reinforcement typically has a Young's modulus at 25° C. of at least 3 GPa. For example, the reinforcement typically has a Young's modulus at 25° C. of from 3 to 1,000 GPa, alternatively from 3 to 200 GPa, alternatively from 10 to 100 GPa. Moreover, the reinforcement typically has a tensile strength at 25° C. of at least 50 MPa. For example, the reinforcement typically has a tensile strength at 25° C. of from 50 to 10,000 MPa, alternatively from 50 to 1,000 MPa, alternatively from 50 to 500 MPa.

The fiber reinforcement can be a woven fabric, e.g., a cloth; a nonwoven fabric, e.g., a mat or roving; or loose (individual) fibers. The fibers in the reinforcement are typically cylindrical in shape and have a diameter of from 1 to 100 µm, alternatively from 1 to 20 µm, alternatively form 1 to 10 µm. Loose fibers may be continuous, meaning the fibers extend throughout the reinforced silicone resin film in a generally unbroken manner, or chopped.

The fiber reinforcement is typically heat-treated prior to use to remove organic contaminants. For example, the fiber reinforcement is typically heated in air at an elevated temperature, for example, 575° C., for a suitable period of time, for example 2 h.

Examples of fiber reinforcements include, but are not limited to reinforcements comprising glass fibers; quartz fibers; graphite fibers; nylon fibers; polyester fibers; aramid fibers, such as Kevlar® and Nomex®; polyethylene fibers; polypropylene fibers; and silicon carbide fibers.

The fiber reinforcement can be impregnated in the free radical-curable silicone composition, described above, using a variety of methods. For example, according to a first method, the fiber reinforcement can be impregnated by (i) applying the free radical-curable silicone composition to a release liner to form a silicone film; (ii) embedding the fiber reinforcement in the film; (iii) degassing the embedded fiber reinforcement; and (iv) applying the free radical-curable silicone composition to the degassed embedded fiber reinforcement to form an impregnated fiber reinforcement.

In step (i), the free radical-curable silicone composition, described above, is applied to a release liner to form a silicone film. The release liner can be any rigid or flexible material having a surface from which the reinforced silicone resin film can be removed without damage by delamination after the silicone resin is cured, as described below. Examples of release liners include, but are not limited to, Nylon, polyethyleneterephthalate, and polyimide.

The free radical-curable silicone composition can be applied to the release liner using conventional coating techniques, such as spin coating, dipping, spraying, brushing, or screen-printing. The silicone composition is applied in an amount sufficient to embed the fiber reinforcement in step (ii), below.

In step (ii), the fiber reinforcement is embedded in the silicone film. The fiber reinforcement can be embedded in the silicone film by simply placing the reinforcement on the film and allowing the silicone composition of the film to saturate the reinforcement.

In step (iii), the embedded fiber reinforcement is degassed. The embedded fiber reinforcement can be degassed by subjecting it to a vacuum at a temperature of from room temperature (~23±2° C.) to 60° C., for a period of time sufficient to remove entrapped air in the embedded reinforcement. For example, the embedded fiber reinforcement can typically be degassed by subjecting it to a pressure of from 1,000 to 20,000 Pa for 5 to 60 min. at room temperature.

In step (iv), the free radical-curable silicone composition is applied to the degassed embedded fiber reinforcement to form an impregnated fiber reinforcement. The silicone composition can be applied to the degassed embedded fiber reinforcement using conventional methods, as described above for step (i).

The first method can further comprise the step of (v) degassing the impregnated fiber reinforcement.

Alternatively, according to a second method, the fiber reinforcement can be impregnated in the free radical-curable silicone composition by (i) depositing the fiber reinforcement on a release liner; (ii) embedding the fiber reinforcement in the free radical-curable silicone composition; (iii) degassing the embedded fiber reinforcement; and (iv) applying the free radical-curable silicone composition to the degassed embedded fiber reinforcement to form an impregnated fiber reinforcement. The second method can further comprise the step of (v) degassing the impregnated fiber reinforcement. In the second method, steps (iii) to (v) are as described above for the first method of impregnating the fiber reinforcement in the free radical-curable silicone composition.

In step (ii), the fiber reinforcement is embedded in the free radical-curable silicone composition. The reinforcement can be embedded in the silicone composition by simply covering the reinforcement with the composition and allowing the composition to saturate the reinforcement.

Furthermore, when the fiber reinforcement is a woven or nonwoven fabric, the reinforcement can be impregnated in the free radical-curable silicone composition by passing it through the composition. The fabric is typically passed through the silicone composition at a rate of from 1 to 1,000 cm/s at room temperature (~23±2° C.).

In the second step of the method of preparing a reinforced silicone resin film, the silicone resin of the impregnated fiber reinforcement is cured. The silicone resin can be cured using a variety of methods, depending on whether the free radical-curable silicone composition used to impregnate the fiber reinforcement contains a free radical initiator. For example, when the silicone composition does not contain a free radical initiator, the silicone resin can be cured by exposing the impregnated fiber reinforcement to high energy radiation in the form of an electron beam. Typically, the accelerating voltage is from about 0.1 to 100 keV, the vacuum is from about 10 to $10^{-3}$ Pa, the electron current is from about 0.0001 to 1 ampere, and the power varies from about 0.1 watt to 1 kilowatt. The dose is typically from about 100 microcoulomb/$cm^2$ to 100 coulomb/$cm^2$, alternatively from about 1 to 10 coulombs/$cm^2$. Depending on the voltage, the time of exposure is typically from about 10 seconds to 1 hour.

Also, when the silicone composition used to impregnate the fiber reinforcement contains a free radical photoinitiator, described above, the silicone resin can be cured by exposing the impregnated fiber reinforcement to radiation having a wavelength of from 150 to 800 nm, alternatively from 250 to 400 nm, at a dosage sufficient to cure (cross-link) the silicone resin. The light source is typically a medium pressure mercury-arc lamp. The dose of radiation is typically from 10 to 20,000 mJ/$cm^2$, alternatively from 100 to 2,000 mJ/$cm^2$. Furthermore, the impregnated fiber reinforcement can be externally heated during or after exposure to radiation.

Further, when the silicone composition used to impregnate the fiber reinforcement contains an organic peroxide, the silicone resin can be cured by exposing the impregnated fiber reinforcement to an electron beam, as described above, or by heating the impregnated fiber reinforcement. For example, the silicone resin can be cured by heating the impregnated fiber reinforcement at a temperature of from 50 to 250° C., for a period of from 1 to 50 h.

When the step of impregnating uses a release liner, the method of preparing the reinforced silicone resin film can further comprise the step of separating the reinforced silicone resin film from the release liner. The reinforced silicone resin film can be separated from the release liner by mechanically peeling the film away from the release liner.

The method of the present invention can further comprise forming a coating on at least a portion of the reinforced silicone resin film. Examples of coatings include, but are not limited to, cured silicone resins prepared by curing hydrosilylation-curable silicone resins or condensation-curable silicone resins; cured silicone resins prepared by curing sols of organosilsesquioxane resins; inorganic oxides, such as indium tin oxide, silicon dioxide, and titanium dioxide; inorganic nitrides, such as silicon nitride and gallium nitride; metals, such as copper, silver, gold, nickel, and chromium; and silicon, such as amorphous silicon, microcrystalline silicon, and polycrystalline silicon.

The reinforced silicone resin film of the present invention typically comprises from 10 to 99% (w/w), alternatively from 30 to 95% (w/w), alternatively from 60 to 95% (w/w), alternatively from 80 to 95% (w/w), of the cured silicone resin. Also, the reinforced silicone resin film typically has a thickness of from 15 to 500 μm, alternatively from 15 to 300 μm, alternatively from 20 to 150 μm, alternatively from 30 to 125 μm.

The reinforced silicone resin film typically has a flexibility such that the film can be bent over a cylindrical steel mandrel having a diameter less than or equal to 3.2 mm without cracking, where the flexibility is determined as described in ASTM Standard D522-93a, Method B.

The reinforced silicone resin film has low coefficient of linear thermal expansion (CTE), high tensile strength, and high modulus. For example the film typically has a CTE of from 0 to 80 μm/m° C., alternatively from 0 to 20 μm/m° C., alternatively from 2 to 10 μm/m° C., at temperature of from room temperature (~23±2° C.) to 200° C. Also, the film typically has a tensile strength at 25° C. of from 50 to 200 MPa, alternatively from 80 to 200 MPa, alternatively from 100 to 200 MPa. Further, the reinforced silicone resin film typically has a Young's modulus at 25° C. of from 2 to 10 GPa, alternatively from 2 to 6 GPa, alternatively from 3 to 5 GPa.

The transparency of the reinforced silicone resin film depends on a number of factors, such as the composition of the cured silicone resin, the thickness of the film, and the refractive index of the fiber reinforcement. The reinforced silicone resin film typically has a transparency (% transmittance) of at least 50%, alternatively at least 60%, alternatively at least 75%, alternatively at least 85%, in the visible region of the electromagnetic spectrum.

The reinforced silicone resin film of the present invention has low coefficient of thermal expansion, high tensile strength, and high modulus compared to an un-reinforced silicone resin film prepared from the same silicone composition. Also, although the reinforced and un-reinforced silicone resin films have comparable glass transition temperatures, the reinforced film exhibits a much smaller change in modulus in the temperature range corresponding to the glass transition.

The reinforced silicone resin film of the present invention is useful in applications requiring films having high thermal stability, flexibility, mechanical strength, and transparency. For example, the silicone resin film can be used as an integral component of flexible displays, solar cells, flexible electronic boards, touch screens, fire-resistant wallpaper, and impact-resistant windows. The film is also a suitable substrate for transparent or nontransparent electrodes.

EXAMPLES

The following examples are presented to better illustrate the method and reinforced silicone resin film of the present invention, but are not to be considered as limiting the invention, which is delineated in the appended claims. Unless otherwise noted, all parts and percentages reported in the examples are by weight. The following methods and materials were employed in the examples:

Measurement of Mechanical Properties

Young's modulus, tensile strength, and tensile strain at break were measured using an MTS Alliance RT/5 testing frame, equipped with a 100-N load cell. Young's modulus, tensile strength, and tensile strain were determined at room temperature (~23±2° C.) for the test specimens of Examples 2 and 3.

The test specimen was loaded into two pneumatic grips spaced apart 25 mm and pulled at a crosshead speed of 1 mm/min. Load and displacement data were continuously collected. The steepest slope in the initial section of the load-displacement curve was taken as the Young's modulus. Reported values for Young's modulus (GPa), tensile strength (MPa), and tensile strain (%) each represent the average of three measurements made on different dumbbell-shaped test specimens from the same reinforced silicone resin film.

The highest point on the load-displacement curve was used to calculate the tensile strength according to the equation:

$$\sigma = F/(wb),$$

where:
σ=tensile strength, MPa,
F=highest force, N,
w=width of the test specimen, mm, and
b=thickness of the test specimen, mm.

The tensile strain at break was approximated by dividing the difference in grip separation before and after testing by the initial separation according to the equation:

$$\in = 100(l_2 - l_1)/l_1,$$

where:
∈=tensile strain at break, %,
$l_2$=final separation of the grips, mm, and
$l_1$=initial separation of the grips, mm.

Glass Fabric, which is available from JPS Glass (Slater, S.C.), is an untreated style 106 electrical glass fabric having a plain weave and a thickness of 37.5 μm.

Example 1

This example demonstrates the preparation of the silicone resin used in Examples 2 and 3. Trimethoxyphenylsilane (200 g), tetramethyldivinyldisiloxane (38.7 g), deionized water (65.5 g), toluene (256 g), and trifluoromethanesulfonic acid (1.7 g) were combined in a 3-neck, round-bottom flask equipped with a Dean-Stark Trap and thermometer. The mixture was heated at 60 to 65° C. for 2 hours. The mixture was then heated to reflux and water and methanol were removed using a Dean-Stark trap. When the temperature of the mixture reached 80° C. and the removal of water and methanol was complete, the mixture was cooled to less than 50° C. Calcium carbonate (3.3 g) and water (about 1 g) were added to the mixture. The mixture was stirred at room temperature for 2 hours and then potassium hydroxide (0.17 g) was added to the mixture. The mixture was then heated to reflux and water was removed using a Dean-Stark trap. When the reaction temperature reached 120° C. and the removal of water was complete, the mixture was cooled to less than 40° C. Chlorodimethylvinylsilane (0.37 g) was added to the mixture and mixing was continued at room temperature for 1 hour. The mixture was filtered to give a solution of a silicone resin having the formula $(PhSiO_{3/2})_{0.75}(ViMe_2SiO_{1/2})_{0.25}$ in toluene. The resin has a weight-average molecular weight of about 1700, has a number-average molecular weight of about 1440, and contains about 1 mol % of silicon-bonded hydroxy groups.

The volume of the solution was adjusted to produce a solution containing 79.5 percent by weight of the silicone resin in toluene. The resin concentration of the solution was determined by measuring the weight loss after drying a sample (2.0 g) of the solution in an oven at 150° C. for 1.5 hours.

Example 2

The resin solution of Example 1 was mixed with t-butyl peroxybenzoate (0.4% w/w). Glass Fabric (38.1 cm×8.9 cm) was impregnated in the mixture by passing the fabric through the composition at a rate of about 5 cm/s. The impregnated glass fabric was suspended vertically in a fume hood overnight and then heated in an air-circulating oven according to the following cycle: room temperature to 200° C. at 5° C./min., 200° C. for 2 h. The oven was turned off and the glass-fiber reinforced silicone resin film was allowed to cool to room temperature. The mechanical properties of the reinforced silicone resin film are shown in Table 1.

Example 3

The resin solution of Example 1 was mixed with of t-butyl peroxybenzoate (1.0% w/w). A glass fiber-reinforced silicone resin film was prepared according to the method of Example 2. The mechanical properties of the reinforced silicone resin film are shown in Table 1.

TABLE 1

| Ex. | Thickness (mm) | Tensile Strength (MPa), Warp | Young's Modulus (GPa), Warp | Strain at Break (%), Warp |
|---|---|---|---|---|
| 2 | 0.110 | 48.2 ± 4.7 | 2.10 ± 0.18 | 3.3 ± 0.3 |
| 3 | 0.110 | 44.7 ± 3.8 | 2.27 ± 0.07 | 2.5 ± 0.1 |

That which is claimed is:
1. A method of preparing a reinforced silicone resin film, the method comprising the steps of:
impregnating a fiber reinforcement in a free radical-curable silicone composition comprising a silicone resin; and
curing the silicone resin of the impregnated fiber reinforcement; wherein the reinforced silicone resin film comprises from 10 to 99% (w/w) of the cured silicone resin and the film has a thickness of from 15 to 500 μm, wherein the film has a flexibility such that the film can be bent over a cylindrical steel mandrel having a diameter less than or equal to 3.2 mm without cracking, where the flexibility is determined as described in ASTM Standard D522-93a, Method B.

2. The method according to claim 1, wherein the free radical-curable silicone composition comprises a silicone resin having the formula

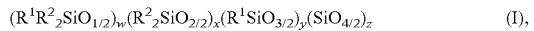
$$(R^1R^2{}_2SiO_{1/2})_w(R^2{}_2SiO_{2/2})_x(R^1SiO_{3/2})_y(SiO_{4/2})_z \qquad (I),$$

wherein $R^1$ is $C_1$ to $C_{10}$ hydrocarbyl or $C_1$ to $C_{10}$ halogen-substituted hydrocarbyl, both free of aliphatic unsaturation; $R^2$ is $R^1$, alkenyl, or alkynyl; w is from 0 to 0.99; x is from 0 to 0.99; y is from 0 to 0.99; z is from 0 to 0.65; w+x is from 0.01 to 0.99; y+z is from 0.01 to 0.99; and w+x+y+z=1.

3. The method according to claim 2, wherein the resin contains an average of at least one alkenyl group or alkynyl group, per molecule.

4. The method according to claim 1, wherein the free radical-curable silicone composition further comprises at least one silicone rubber having an average of at least one silicon-bonded alkenyl group per molecule.

5. The method according to claim 1, wherein the free radical-curable silicone composition further comprises an unsaturated compound selected from (i) at least one organosilicon compound having at least one silicon-bonded alkenyl group per molecule, (ii) at least one organic compound having at least one aliphatic carbon-carbon double bond per molecule, and (iii) mixtures comprising (i) and (ii), wherein the unsaturated compound has a molecular weight less than 500.

6. The method according to claim 1, wherein the free radical-curable silicone composition further comprises at least one free radical initiator selected from a free radical photoinitiator and an organic peroxide.

7. The method according to claim 1, further comprising forming a coating on at least a portion of the silicone resin film.

8. The method according to claim 7, wherein the coating is a cured silicone resin.

9. A silicone resin film prepared according to the methods of claims 1 or 7.

* * * * *

UNITED STATES PATENT AND TRADEMARK OFFICE
CERTIFICATE OF CORRECTION

| | | |
|---|---|---|
| PATENT NO. | : 8,334,022 B2 | Page 1 of 1 |
| APPLICATION NO. | : 11/989896 | |
| DATED | : December 18, 2012 | |
| INVENTOR(S) | : Anderson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this
Eleventh Day of November, 2014

Michelle K. Lee
*Deputy Director of the United States Patent and Trademark Office*